(No Model.)

C. S. CASE.
ARTIFICIAL TOOTH CROWN AND ITS ATTACHMENTS.

No. 328,837. Patented Oct. 20, 1885.

WITNESSES
Chas. R. Burr
J. S. Barker

INVENTOR
Calvin S. Case
by Doubleday & Bliss
Attorney

United States Patent Office.

CALVIN S. CASE, OF JACKSON, MICHIGAN.

ARTIFICIAL TOOTH-CROWN AND ITS ATTACHMENTS.

SPECIFICATION forming part of Letters Patent No. 328,837, dated October 20, 1885.

Application filed September 11, 1884. Serial No. 142,810. (No model.)

*To all whom it may concern:*

Be it known that I, CALVIN S. CASE, a citizen of the United States, residing at Jackson, in the county of Jackson and State of Michigan, have invented certain new and useful Improvements in Artificial Tooth-Crowns and Means for Attaching the Same to Roots of Natural Teeth, of which the following is a specification, reference being had therein to the accompanying drawings.

My invention relates to a new and improved artificial tooth-crown, adapted to be attached to the stump or root of a natural tooth and to certain improved devices for effecting such attachment, as will be fully hereinafter explained.

Figure 1:
Figure 2:
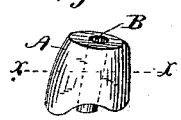
Figure 3:
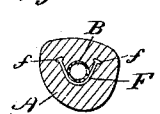
Figure 4:
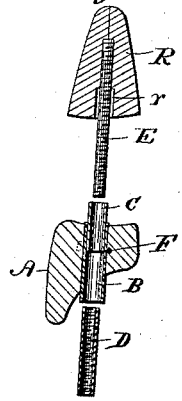
Figure 5:
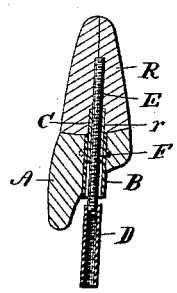
Figure 6:
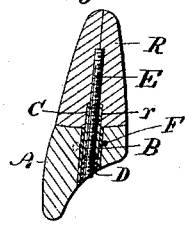

Figure 1 is a side view of a crown for an upper incisor tooth. Fig. 2 is a similar view of a bicuspid-tooth crown. Fig. 3 is a transverse section on the line *x x*, Fig. 2. Fig. 4 is a vertical section of the root or stump of a natural tooth, the artificial crown, and the means for connecting them, the parts being shown separated. Fig. 5 is a similar view after the parts have been untied. Fig. 6 is a sectional view of the completed tooth.

In the drawings, A represents the crown, made from porcelain or any other desired material, and provided with a small tube, B, preferably of platinum, extending through it centrally, it being placed in such position during the process of manufacturing the crown. These crowns are made of various shapes, sizes, and colors to match the other teeth of the user, as is common in this class of work.

F is a small pin or wire placed in about the center of the crown A, and adapted to give additional strength to the tooth and reduce the danger of fracturing or breaking the crown. It is provided at its ends with small heads *f*, which give it a firm hold in the material of which the crown is composed, and is bent partially around tube B, as shown in Fig. 3.

When it is desired to attach my improved crown to the root or stump R of a natural tooth, it (the root) is first properly dressed off upon its surface and filled, if necessary. I then insert therein a screw-threaded post or stem E, either by drilling a hole in the root into which the post is tightly screwed, or by filling the cavity, should there be one in the center of the tooth, with any desired kind of filling or cement, into which the post is inserted. The lower part of the aperture in the root R is somewhat enlarged, as at *r*, forming an annular cavity around the post, extending a short distance into the tooth toward its center.

In order to better unite the crown and the root, and to give a comparatively long and rigid bearing for the parts which connect the two, I insert into and solder to the tube B a smaller tube, C, of gold, silver, or other metal, which projects a short distance above the upper face of the tooth-crown. This tube C is of such size that it closely fits into the tube B, and also fits over the post or stem E, and is cut of such length that it completely fills the cavity *r*, which has been prepared for its reception.

After the engaging faces of the root and crown have been properly ground to fit each other accurately the tube C is slipped over the post E and into the cavity *r*. When the parts are thus brought close together, the screw-threaded post E extends through tubes C and D and projects a short distance below the lower end of the tube B. I then take an internally-screw-threaded cylindrical coupling-tube, D, of such diameter as to closely fit into the platinum tube B, and screw it upon the post until its end comes in contact with the shoulder *c*, formed by the lower end of the short tube C, when by a further movement of the cylindrical coupler D the parts are tightly forced together. The projecting ends of tubes B and D and post E are then cut away and the exposed surface polished, thus completing the tooth.

In place of the cylindrical coupler D, I may employ a short nut to engage with post E, and thus connect the crown with the natural root; but I prefer the construction shown, as it entirely closes the cavity within the tooth, and prevents the entrance of moisture or small particles of food.

By attaching the above-described crown in the manner set forth a tooth is formed which can scarcely be distinguished from a natural tooth, and which well serves for the process of mastication. It will be seen that the connection between the two parts of the tooth consists of two concentric tubes surrounding and attached to a post or stem situated in the root of the natural tooth, one of the tubes carried by the artificial crown projecting above the surface of the crown and entering the annular cavity surrounding post E. This arrangement makes the tooth very much stronger than if the ends were simply flush with the surface of the crown.

While I have only shown my invention as applied to a front upper incisor tooth, for the purpose of illustration, yet it will be understood that it is applicable to any of the teeth, whether incisors, bicuspids, or molars.

I do not wish to be limited to all the details herein shown, as some of them may be omitted or others substituted therefor without departing from the spirit of my invention.

For instance, I may extend the tube B above the surface of the crown instead of using the separate tube C, it being provided with a shoulder or stop of any kind to receive the thrust of the end of the coupling tube or cylinder D; but the construction shown is much preferable, as it is often necessary to grind the crown to fit it to the root before attaching it, and the presence of a tube projecting above the surface of the crown would interfere with such grinding, this being one of the objections which led me to use the tube C, which latter is soldered into the tube carried by the artificial crown after the latter has been ground.

It will of course be understood that cement of some sort will be used between the adjacent faces of the two parts of the tooth.

I am aware that a short tube threaded both internally and externally has been inserted into the natural root, and that a screw has been used therewith to hold the crown, said screw engaging with the internal thread of the tube in the root. My construction has the advantage that the socket required in the natural root is of minimum diameter, and therefore the root is left as strong as possible. Moreover, the inserting of a long post in the root can be effected much more easily than can be the inserting of the short tube (alluded to above) terminating at the surface of the root. So, also, by properly shaping the cavity $r$, and making the tube C of such size and form that it shall fit accurately the inner walls of that cavity, I secure important results in the way of firmly supporting the crown which I believe cannot be attained by any known construction.

I do not in this case claim any invention except that which is specifically recited in the claims hereof, reserving the right to claim all other patentable features which are shown or described in another application, which I have filed as a division hereof, and which was filed September 26, 1885, Serial No. 178,291.

What I claim is—

1. The combination, with an artificial tooth-crown and a tube or rod passing through it, of the strengthening pin or wire F, curved around the said tube or rod, and having enlarged heads $f$, substantially as set forth.

2. An artificial tooth-crown having a tube situated centrally therein and projecting beyond the face of the crown, which lies next the natural root, and a stop or shoulder within the tube, substantially as and for the purposes set forth.

3. The herein-described artificial crown A, provided with tube B and smaller tube C, projecting from the end of tube B, and forming a shoulder, $c$, therein, substantially as and for the purposes set forth.

4. An artificial tooth-crown having a tube situated centrally therein and a stop or shoulder within the tube, substantially as set forth.

5. The combination, with the root of a natural tooth, of an artificial crown, a screw-threaded post inserted into the natural root and projecting through the crown when the latter is in place, and a nut which engages with said screw-threaded post and unites the crown with the root, substantially as set forth.

6. In combination with the root of a natural tooth having the cavity $r$, the screw-threaded post E, the crown having a tube extending centrally through it and adapted to enter the cavity $r$, the screw-threaded coupler D, and a stop with which the coupler engages, substantially as set forth.

7. The combination, with the root of a natural tooth provided with the cavity $r$, of the artificial crown, the tube B, passing through the crown, the smaller tube C, seated in tube B and forming a shoulder therein, as at $c$, and adapted to enter cavity $r$, the screw-threaded post or stem E, seated in the root and adapted to extend through tubes B and C when the parts are in position, and the coupling-tube D, adapted to enter tube B and engage with the post, to unite the parts together, substantially as described.

In testimony whereof I affix my signature in presence of two witnesses.

CALVIN S. CASE.

Witnesses:
W. M. THOMPSON,
G. R. BYRNE.